United States Patent [19]

Naedler

[11] Patent Number: 5,767,398
[45] Date of Patent: Jun. 16, 1998

[54] TIRE LEAK DETECTOR FOR AN AUTOMATIC INFLATION SYSTEM

[75] Inventor: Mark Henry Naedler, San Antonio, Tex.

[73] Assignee: Equalaire Systems, Inc., Corpus Christi, Tex.

[21] Appl. No.: 753,142

[22] Filed: Nov. 20, 1996

[51] Int. Cl.⁶ ........................................... E01C 23/00
[52] U.S. Cl. ........................ 73/146.2; 73/40; 73/48; 73/49
[58] Field of Search ................... 152/41.5, 417, 152/416; 73/146, 146.2, 146.8, 40, 48; 340/605

[56] References Cited

U.S. PATENT DOCUMENTS

| | | | |
|---|---|---|---|
| 3,982,255 | 9/1976 | Schlanzky | 340/58 |
| 4,004,271 | 1/1977 | Haven et al. | 340/58 |
| 4,221,124 | 9/1980 | Jones | 73/40 |
| 4,235,185 | 11/1980 | Byram | 116/34 R |
| 4,324,112 | 4/1982 | Fujiwara et al. | 62/511 |
| 4,724,879 | 2/1988 | Schultz | 152/416 |
| 4,742,857 | 5/1988 | Gandhi | 152/418 |
| 4,754,792 | 7/1988 | Braun et al. | 152/417 |
| 4,763,709 | 8/1988 | Scholer | 73/146.2 X |
| 4,862,938 | 9/1989 | Mittal | 152/417 |
| 5,064,448 | 11/1991 | Choi | 55/38 |
| 5,141,589 | 8/1992 | Mittal | 152/415 |
| 5,181,977 | 1/1993 | Gneiding et al. | 152/429 |
| 5,287,906 | 2/1994 | Stech | 152/417 |
| 5,363,857 | 11/1994 | Howard | 128/718 |
| 5,495,880 | 3/1996 | Yasushi | 152/415 |

Primary Examiner—Hezron E. Williams
Assistant Examiner—Jay L. Politzer
Attorney, Agent, or Firm—Fulbright & Jaworski

[57] ABSTRACT

An improvement in an air inflation system for a vehicle of an improved sensor for detecting an air leak including an air flow restriction positioned in the air connection between the air supply and the tires and an air actuated differential pressure switch connected to the air connection upstream and downstream of the flow restriction for actuating a warning indicator when air is being supplied to a tire.

5 Claims, 3 Drawing Sheets

TIRE LEAK DETECTOR FOR AN AUTOMATIC INFLATION SYSTEM

BACKGROUND OF THE INVENTION

The present invention is directed to an improvement in a sensor for detecting an air leak in a tire in an automatic tire inflation system (ATIS).

An automatic tire inflation system controls the inflation pressure of tires on a vehicle, such as a truck-trailer. The ATIS will provide air to a tire when the tire's air pressure falls below the desired pressure. However, users often want a warning when a tire has lost pressure. This warning can prevent irreparable damage to the tire and its surroundings.

Conventionally, this warning is initiated by a set pressure switch that makes contact when the pressure in the automatic tire inflation system falls below a preset level. However, such a switch must be carefully set each time the tire pressure is adjusted. In addition, vibration and time can change this setting and repeated adjustment is sometimes necessary.

The present invention is directed to an improved sensor for detecting an air leak using a pressure differential switch which monitors pressure upstream of a flow restriction and downstream of the flow restriction. Thus, when there is a leak and the tire's air pressure falls below a desired pressure the ATIS transmits air to the tire and air is moving in the system. The pressure upstream of the flow restriction is greater than the pressure downstream of the flow restriction thereby providing a differential pressure which actuates the pressure differential switch. The switch in turn actuates an electrical contact for turning on a warning indicator.

The present improved sensor requires no setting or adjustment regardless of the tire pressure as it is actuated by a predetermined differential pressure created by the moving air supply. Such a sensor is more sensitive than the equivalently priced pressure switch.

SUMMARY

The present invention is directed to an improvement in an air inflation system for a vehicle having at least one axle with at least one wheel having a pneumatic tire at each end of the axle, an air supply, an air connection between the air supply and the tires, a warning indicator and a pressure control valve controlling the pressure in the air connection of a sensor for detecting an air leak in a tire.

The sensor includes an air flow restriction positioned in the air connection, an air actuated differential pressure switch having first and second air inlets in which one of the inlets is connected to the air connection upstream of the flow restriction and the second input is connected to the air connection downstream of the flow restriction. The differential pressure switch is connected to and actuates the warning indicator when the pressure switch is subjected to a predetermined differential pressure.

A further object is wherein the differential pressure switch has a normally open electrical contact which closes when the differential pressure switch is actuated by a differential pressure between the first and second inputs. The electrical contact is electrically connected to and in turn actuates a warning indicator when actuated.

Still a further object of the present invention is wherein the flow restrictor includes a venturi.

Yet a still further object of the present invention is wherein the flow restrictor includes an orifice.

Yet a still further object of the present invention is wherein the differential pressure switch includes a diaphragm between the first and second inputs.

Other and further objects, features and advantages will be apparent from the following description of presently preferred embodiments of the invention, given for the purpose of disclosure, and taken in conjunction with the accompanying drawings.

DESCRIPTION OF THE PREFERRED EMBODIMENT

The sensor for detecting an air leak in a tire of the present invention may be used in various types of automatic tire inflation systems and for convenience of reference only, will be described in connection with an ATIS disclosed in U.S. patent application Ser. No. 08/385,504, filed Feb. 8, 1995, entitled "Air Inflation System for Trailer Axles", now U.S. Pat. No. 5,584,949. However, the present sensor can also be used in other types of ATIS, such as shown in U.S. Pat. No. 5,287,906 and U.S. patent application Ser. No. 08/706,080, filed Aug. 30, 1996, entitled Rotary Air Connection for Tire Inflation System.

Figure 1:
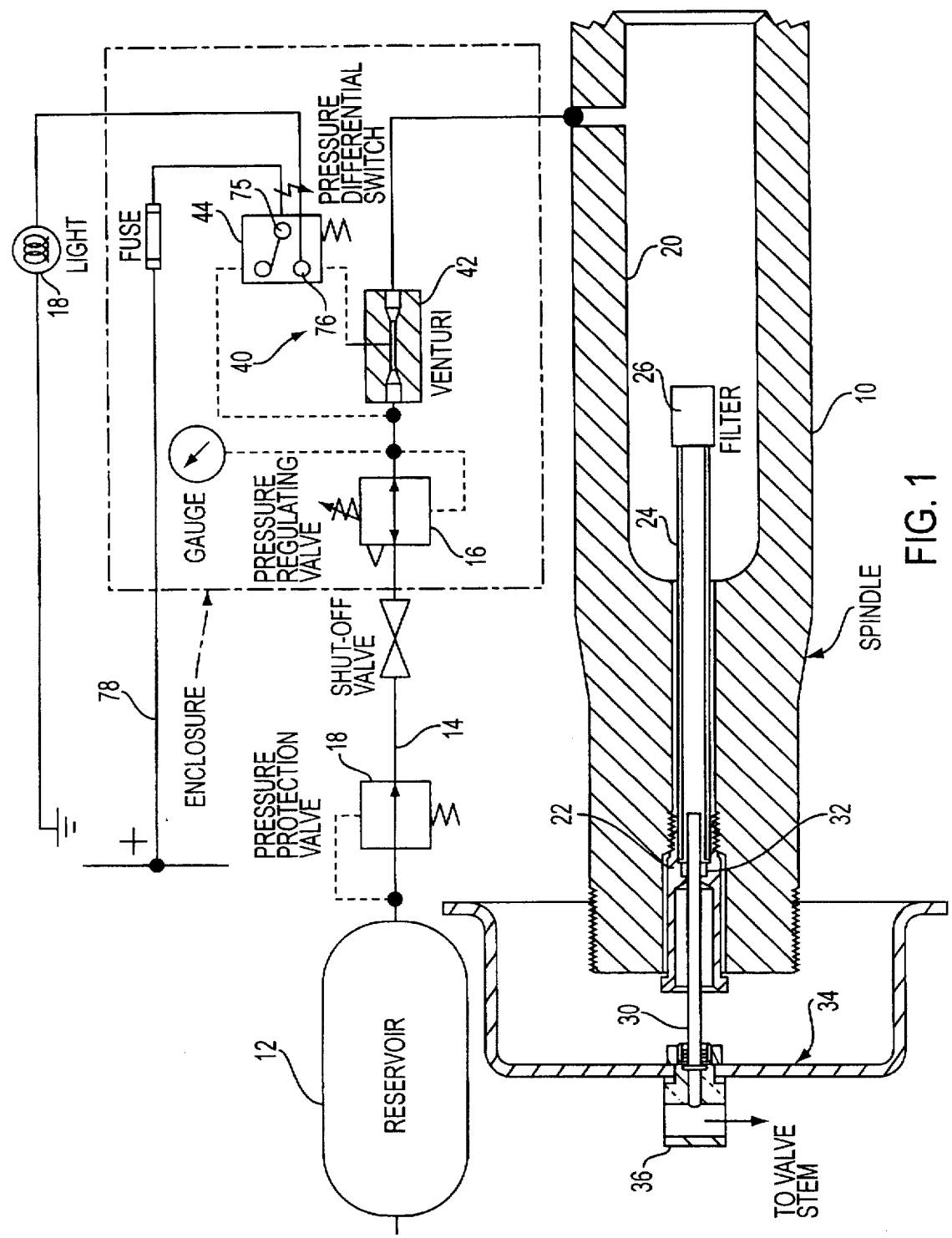
FIG. 1 is a fragmentary schematic diagram of an air inflation system of the present invention, including one type of air flow restrictor.

Referring now to the drawings, and particularly to FIG. 1, the reference numeral 10 generally indicates one axle of a vehicle such as a truck-trailer having a plurality of axles with wheels having one or more pneumatic tires (not shown) at each end of the axle, an air supply 12, an air connection 14 between the air supply 12 and the tires for supplying air thereto, a pressure control switch, such as a pressure regulating valve 16, for controlling the pressure in the air connection 14, and a warning indicator 18, such as a warning light. A low pressure protection valve 18 may also be used which only moves to the open position when a predetermined value of pressure in the air supply 12 is available.

In the present ATIS, similar to that disclosed in U.S. patent application Ser. No. 08/385,504, filed Feb. 8, 1995, now U.S. Pat. No. 5,584,949, which is hereby incorporated herein by reference, the air connection 14 supplies air and pressurizes the inside 20 of the axle 10 with air for supplying air to the pneumatic tires at each end of the axle 10. An air sealing barrier 22 is sealing connected in each end of the axle 10, and supports a conduit 24, and an air filter 26, for receiving the air in the interior of the axle 10. A rotatable tube 30 extends into the conduit 24 through a rotary seal 32 for receiving air and extends through a hub cap 34 and to a stem connector 36 for connection to hoses (not shown) for conducting the air to one or more pneumatic tires.

Thus, a rotatable connection is provided in the air connection 14 for allowing the rotating tires to receive air from the stationary air supply 12. The pressure regulating valve 16 can be suitably set to regulate the tire pressure being supplied to the system from the air supply 12.

Figure 2:
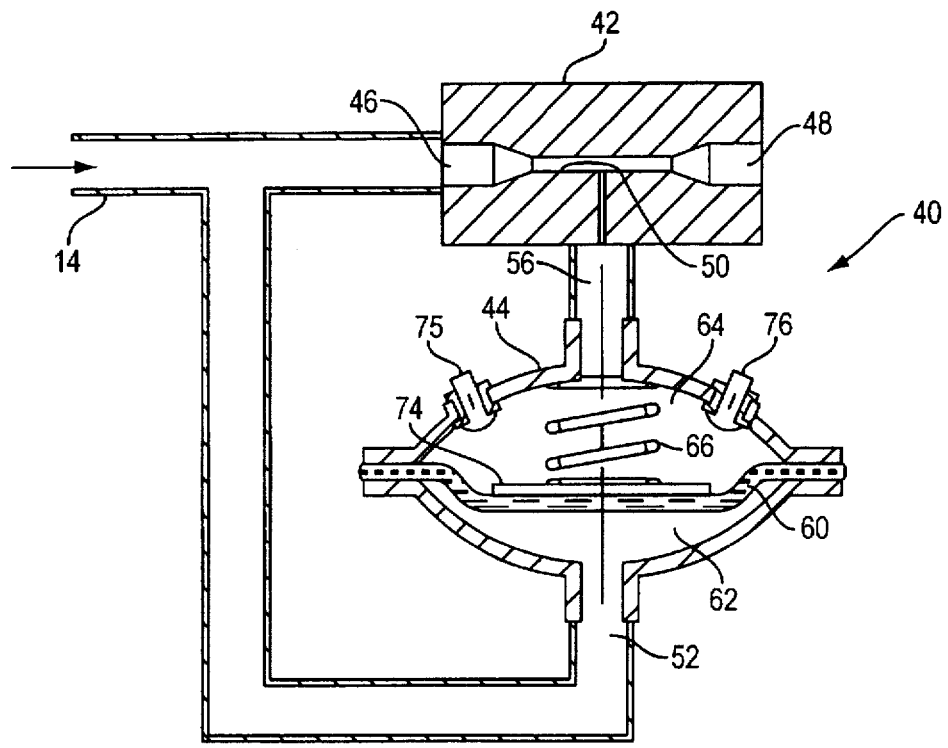
FIG. 2 is an enlarged fragmentary elevational view, cross-sectional, of a portion of the system of FIG. 1 illustrating the sensor in a non-actuated position.
Figure 2A:
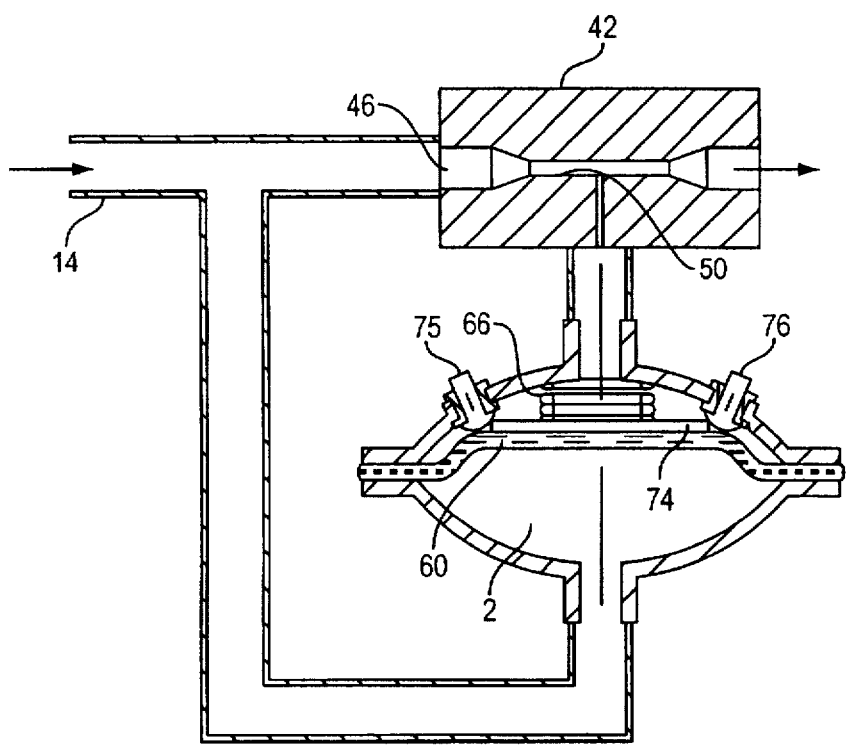
FIG. 2A is a view similar to FIG. 2 showing the sensor of FIG. 2 in the actuated position.

The improved sensor of the present invention is generally indicated by the reference numeral 40 and includes an air flow restriction 42 and an air actuated differential pressure switch 44. As best seen in FIGS. 1, 2 and 2A, the flow restriction 42 may be a venturi. The venturi 42 has an inlet 46, an outlet 48, and a restriction 50. With no air flowing through the air connection 14, the pressure at the inlet 46 and at the restriction 50, are equal.

The air actuated differential pressure switch 44 includes a first input 52 and a second input 56. The first input 52 is connected to the air connection 14 upstream of the restriction 50 and thus has the same pressure as the input 46. The second input 56 is connected to the venturi 42 downstream of the flow restriction 50 and thus has the same air pressure as the air pressure in the restriction 50. Preferably, the differential pressure switch 44 includes a diaphragm 60 having a first side 62 exposed to the pressure at the inlet 52 and a second side 64 exposed and equal to the pressure at the inlet 56. If desired, a biasing spring 66 is provided against the diaphragm 60. The pressure switch 44 is connected to and actuates the warning indicator 18 when the switch is actuated. In the preferred embodiment, a normally open electrical switch having an electrical contact plate 74 and contacts 75 and 76 is provided connected between an electrical power source 78 and the warning indicator 18. However, as indicated in FIG. 2, when no air is flowing to a tire, the pressure on opposite sides 62 and 64 of the diaphragm is equal and the electrical contact switch remains open.

However, when a leak develops in a tire, the pressure downstream of the pressure regulating valve 16 decreases below the preset value, the pressure regulating valve 16 opens and air flows from the air supply 12 through the connection 14 through the air flow restriction 42 and to the leaking tire. As best seen in FIG. 2A, with air flowing through the air connection 14 and through the venturi 42, the air pressure at 46 is greater than the air pressure at 50, thereby unbalancing the air pressure across the diaphragm 60, which overcomes the biasing spring 66, bringing the electrical plate 74 into contact with the contacts 75 and 76 to actuate the warning light 18.

Figure 3:
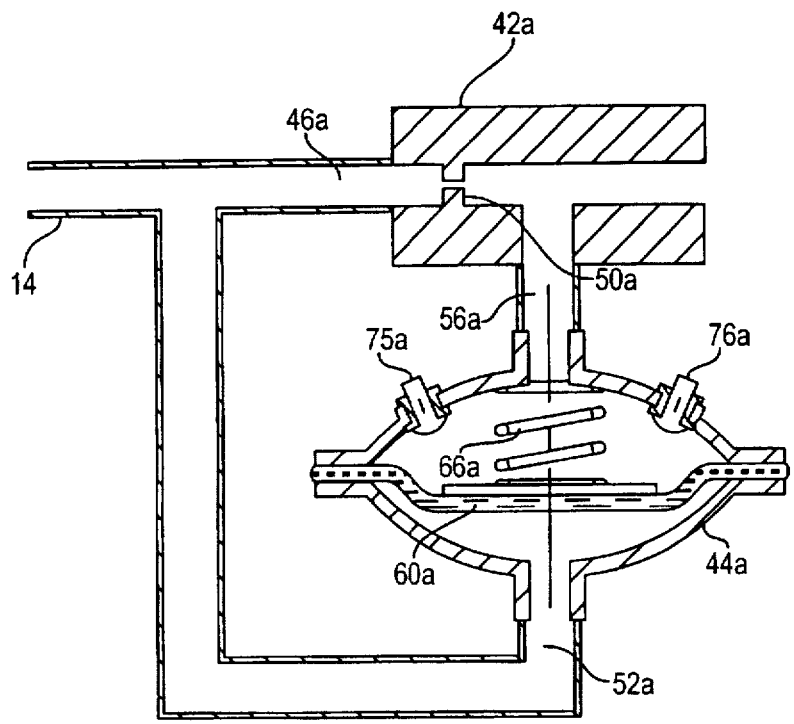
FIG. 3 is a fragmentary elevational view, in cross section, of a different type of air flow restriction in which the sensor is shown in the non-actuated position.
Figure 3A:
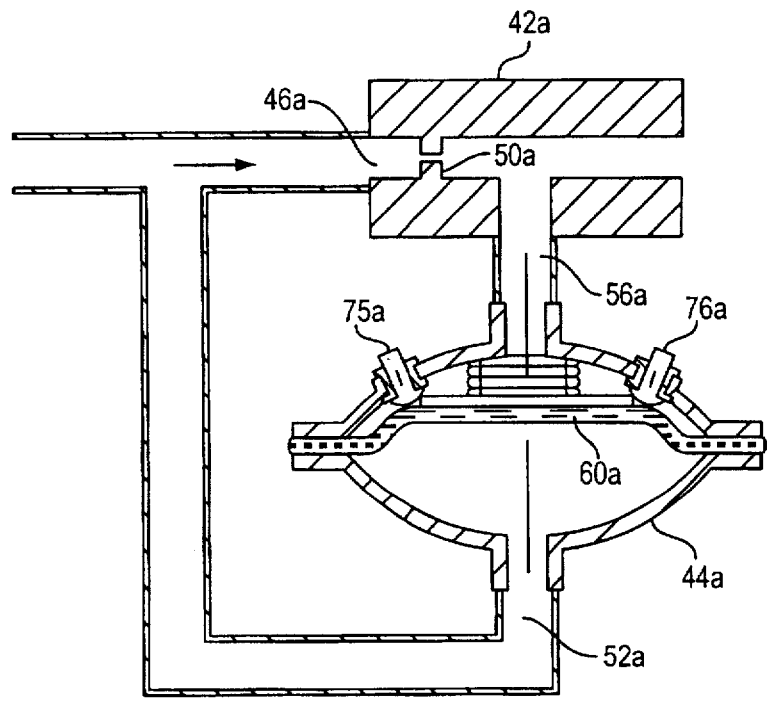
FIG. 3A is a view similar to that shown in FIG. 3 in which the sensor is shown in the actuated position.

Other and further embodiments of the improved sensor of the present invention may be provided such as shown in FIGS. 3 and 3A wherein like parts to those shown in FIGS. 2 and 2A are similarly numbered with the addition of the suffix "a". While the venturi 42 of FIGS. 2 and 2A is more sensitive, the flow restriction 42a of FIGS. 3 and 3A using an orifice may conveniently and inexpensively be used. As shown in FIG. 3 without any air flow through the orifice restriction 42a, the pressure on either side of the diaphragm 60a is balanced leaving the electrical switch unactuated as the diaphragm 60a is biased to the off position by the biasing spring 66a. However, as shown in FIG. 3A in which air is flowing through a tire through the orifice flow restriction 42a, the air pressure at the second inlet 56a is less than the air pressure at the first inlet 52a of the differential pressure switch 44a causing an actuation of the electrical contacts and thus of the warning indicator 10.

The present invention, therefore, is well adapted to carry out the objects and attain the ends and advantages mentioned as well as others inherent therein. While presently preferred embodiments of the invention have been given for the purpose of disclosure, numerous changes in the details of construction and arrangement of parts will be readily apparent to those skilled in the art and which are encompassed within the spirit of the invention and the scope of the appended claims.

What is claimed is:

1. In an air inflation system for a vehicle having at least one axle with at least one wheel having a pneumatic tire at each end of the axle, an air supply, an air connection between the air supply and the tires, a warning indicator, and a pressure control valve controlling the pressure in the air connection, the improvement in a sensor for detecting an air leak in a tire comprising, an air flow restriction positioned in the air connection, providing a predetermined differential pressure across the restriction when a predetermined flow of air passes through the restriction because of a leak, an air actuated differential pressure switch having first and second air inputs, one of the inputs being connected to the air connection upstream of the flow restriction and the second input being connected to the air connection downstream of the flow restriction, said differential pressure switch blocking flow between the first and second inputs and actuated by a predetermined differential pressure across the air flow restriction in response to air flow through the flow restriction, said differential pressure switch being connected to the warning indicator and actuates the warning indicator when the differential pressure switch is actuated by a predetermined differential pressure between the first and second air inputs.

2. The apparatus of claim 1 wherein the flow restriction includes a venturi.

3. The apparatus of claim 1 wherein the flow restriction includes an orifice.

4. The apparatus of claim 1 wherein the differential pressure switch includes a diaphragm between the first and second inputs.

5. The apparatus of claim 1 wherein said differential pressure switch includes a normally open contact which closes when the differential pressure switch is actuated by a differential pressure between the first and second air inputs, and the electrical contact is electrically connected to the warning indicator.

* * * * *